United States Patent
Kalwara et al.

(10) Patent No.: US 6,426,129 B1
(45) Date of Patent: *Jul. 30, 2002

(54) ADHESIVE RUBBER ARTICLE HAVING SCORED RELEASED LINER AND GUIDE TO FACILITATE FIELD APPLICATION AND RELATED METHODS

(75) Inventors: Joseph J. Kalwara, Indianapolis; Daniel L. Barksdale, Brownsburg, both of IN (US)

(73) Assignee: BFS Diversified Products, LLC, Carmel, IN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/037,564

(22) Filed: Mar. 9, 1998

(51) Int. Cl.[7] .............. A64F 13/02; B32B 9/00; B32B 11/00; B32B 11/06
(52) U.S. Cl. ............ 428/41.8; 428/42.1; 428/40.3; 428/489; 428/491; 428/42.2; 428/43
(58) Field of Search .............. 428/41.8, 42.2, 428/40.1, 41.7, 40.3, 42.3, 351, 489, 490, 491, 43, 42.1

(56) References Cited

U.S. PATENT DOCUMENTS

| | | | |
|---|---|---|---|
| 4,091,135 A | * 5/1978 | Tajima et al. | 428/40 |
| 4,757,652 A | 7/1988 | Kalkanoglu | 52/173 R |
| 4,855,172 A | 8/1989 | Chiu | 428/57 |
| 4,966,788 A | 10/1990 | Pell | 427/210 |
| 5,242,727 A | 9/1993 | Briddell et al. | 428/42 |
| 5,504,136 A | 4/1996 | Davis et al. | 524/490 |
| 5,545,685 A | 8/1996 | Davis et al. | 524/490 |
| 5,563,217 A | 10/1996 | Davis et al. | 525/194 |
| 5,612,141 A | 3/1997 | Davis et al. | 428/515 |
| 5,916,654 A | * 6/1999 | Philipps et al. | 428/42.2 |

FOREIGN PATENT DOCUMENTS

| | | |
|---|---|---|
| DE | 195 33 090 A1 | 9/1995 |
| JP | 52-47414 A * | 9/1993 |

OTHER PUBLICATIONS

Derwent Abstract of JP 52–47414 A; Kato Yuji, Sekisui Chem; Pressure Sensitive Adhesive Film, Sep. 1993.*
EPO's Japanese Patent Office Abstract of JP 52–47414 A; Kato Yuji; Self Adhesive Film or Sheet, Sep. 1993.*

* cited by examiner

Primary Examiner—Rena L. Dye
Assistant Examiner—Michael C. Miggins
(74) Attorney, Agent, or Firm—David G. Burleson; Rodney L. Skoglund

(57) ABSTRACT

An adhesive rubber article of the type having a release liner covering its tacky, adhesive surface to prevent the adhesive rubber article from adhering to various substrates or to itself prior to its intended use includes an impression or mark presented on one or more surfaces for facilitating the alignment and application of the adhesive rubber article on one or more substrates. The release liner has been scored, perforated or otherwise cut in a longitudinal direction of the article such that the scoring of the release liner further produces a visual guide on the adhesive rubber article. Thus, upon removal of the release paper, the guide may be used to align and apply the adhesive rubber article to the various substrates. These adhesive rubber articles are particularly useful within the roofing industry for bonding panels of rubber membranes together or for use as flashing.

13 Claims, 1 Drawing Sheet

ADHESIVE RUBBER ARTICLE HAVING SCORED RELEASED LINER AND GUIDE TO FACILITATE FIELD APPLICATION AND RELATED METHODS

TECHNICAL FIELD

The invention relates generally to an adhesive rubber article such as a splice tape or a rubber membrane which has been factory laminated on at least one side to a tape adhesive. More particularly, the present invention relates to an adhesive rubber article of the type having a release liner covering its tacky, adhesive surface to prevent the adhesive rubber article from adhering to various substrates or to itself prior to its intended use, the release liner having been scored, perforated or otherwise cut in a longitudinal direction preferably central to the edges of the article. Specifically, the invention relates to an adhesive rubber article having a visual impression or other guide presented on one or more surfaces of the adhesive rubber article to facilitate the application and placement of the adhesive rubber article on or between various substrates, thereby insuring proper coverage of the substrates so as to provide a watertight seal. Such adhesive rubber articles are particularly useful within the roofing industry for bonding plys of rubber membranes together or for use as flashing.

BACKGROUND OF THE INVENTION

Polymeric roof sheeting materials such as ethylene-propylene-diene terpolymers (EPDM), butyl rubber (IIR), neoprene, polyvinyl chloride, chlorinated polyethylene, thermoplastic polyolefin rubber and modified bitumen and the like are often used as single-ply roofing membranes for covering flat roofs found on industrial or commercial buildings and the like. Such membranes are typically applied to the roof surface in a vulcanized or cured state and are known to provide outstanding weathering resistance and other excellent properties desired of roofing materials. The use of these polymeric materials as roof sheeting materials are well known in the art and act as effective barriers to prevent the penetration of moisture through the roof being covered. EPDM-based roofing membranes in particular have rapidly been gaining acceptance in the roofing industry.

Adhesive rubber articles, such as, inter alia, splice tapes and rubber membranes which have been factory laminated to compatible tape adhesives, are well known in the roofing industry and are typically used by the roofing membrane installer in conjunction with the polymeric sheeting employed. Splice tapes are typically two-sided adhesives used to bond or to seam the edges of adjacent panels of rubber membranes together to provide a waterproof seal. That is, splice tapes are typically interposed between the overlapped edges of two panels of generally flat sheets of rubber membrane to adhere the two panels together and to form a preferably watertight seam. Illustrative examples of splice tapes are found in U.S. Pat. Nos. 5,242,727, 5,504, 136, 5,545,685, 5,563,217, and 5,612,141 the disclosures of which are incorporated herein by reference.

Rubber membranes which have been factory laminated to tape adhesives generally have only one tacky, adhesive surface exposed and are used typically as flashings or the like to cover, seal and waterproof the areas of a roof generally considered not suitable for covering by the flat sheets of rubber membrane. For example, flashing is commonly used to cover and seal those areas of a roof having an uneven or irregular shape, such as curves along and penetrations through the roof. These laminates are particularly suitable for use as flashings, particularly as base flashings and perimeter flashing such as gravel stops; waterproofing batten strips and other rooftop penetrations.

The rubber membrane/tape adhesive laminates discussed hereinabove are typically produced in long strips of 100 feet or more, and are preferably about 5 to about 12 inches wide. It will be appreciated, however, that flashings or laminates can be produced in the form of smaller strips or patches of membrane, depending upon the desired application. An illustrative example of these laminates are found in U.S. Pat. No. 4,855,172, the disclosure of which is also incorporated herein by reference.

Like the polymeric roof sheeting materials employed to make the rubber roofing membranes discussed hereinabove, the adhesive rubber articles employed in the roofing industry generally comprise any of a number of rubber components, including EPDM, butyl-based rubbers, neoprene rubber, and the like, as well as blends thereof. Unlike the rubber membranes however, the adhesive rubber articles include at least one tacky, adhesive surface for adhering to at least one substrate.

To prevent the adhesive rubber article from adhering to undesired substrates or to itself prior to its intended use, it is well known in the art and necessary to apply a release liner over the tacky adhesive surface(s) of the article. Release liners are also well known in the art to prevent unwanted adhesion and are commonly made of paper having a special coating, typically made from silicone, on at least one surface thereof which engages the tacky adhesive surface of the article. The special coating, which is also well known in the art, prevents the adhesive surface of the article from permanently adhering to the paper. Thus, the adhesive rubber article can be selectively removed from the specially coated paper when desired, typically just prior to application of the adhesive rubber article on the substrate(s).

It will be appreciated that other materials, such as plastics, can be used as an alternative to the specially coated paper release liner. Preferred plastic materials for this purpose include various polyolefins such as polyethylene.

Current adhesive rubber articles of the type described hereinabove use release liners which are solid and continuous over the entire tacky surface of the article. While such release liners are highly effective in preventing unwanted adhesion to undesirable substrates, it is oftentimes difficult for roofing installers to remove such release liners while in the field, particularly if the installer does not have the proper tools or sufficiently long fingernails to separate the release liner from the adhesive rubber article.

In addition, once the release liner is removed, the roofing installer must rely on his sight and his hand and eye coordination to align the adhesive rubber article. This sometimes results in the adhesive rubber article being applied off center or at an angle which, while sufficiently covering one part of a seam, does not sufficiently cover another part thereof. The adhesive article might also be bridged or not tight with the substrate. Due to the permanency of the tape adhesives, it is oftentimes required that the installer cut the adhesive rubber article and realign another piece of the adhesive rubber article over that portion of a seam which was not sufficiently covered by the first piece of adhesive.

In addition, there are situations where the tape laminate must cover two planes—a flat (roof) plane, and a vertical (curb) plane. In these situations it is often difficult to align and place the laminate once the total release paper has been removed, exposing the tacky surface of the tape adhesive.

Thus, the need exists for means by which the installer can easily align the adhesive rubber articles during application of the articles to the desired substrates.

While attempts have been made heretofore by roofing component manufacturers to facilitate the ease with which a roofing installer in the field can cover a roof by providing more and more "all-in-one" products, the art has not provided a facile means to facilitate the application and placement of adhesive rubber articles on or between particular substrates, thereby insuring proper coverage of the substrate so as to provide a watertight seal.

SUMMARY OF INVENTION

It is, therefore, an object of the present invention to provide an adhesive rubber article which facilitates application and placement of the article itself on substrates being covered or connected, particularly on a roof.

It is another object of the present invention to provide an adhesive rubber article, as above, which includes a release liner having portions which are easily removed, when desired, from the tacky adhesive surface(s) of the adhesive rubber article.

It is still another object of the present invention to provide an adhesive rubber article, as above, which includes means for aligning the article during application of the article to the desired substrate(s) being covered or connected.

It is yet another object of the present invention to provide an adhesive rubber article, as above, which insures proper coverage of two or more substrates being covered or connected by insuring the proper amount of the article is applied to each substrate being covered or connected.

It is still a further object of the present invention to provide a method, as above, for manufacturing an adhesive rubber article of the type having a release liner, the article further including means for aligning the article over the substrates being covered or connected.

At least one or more of the foregoing objects, together with the advantages thereof over the known art relating to adhesive rubber articles such as splice tapes, rubber membrane/tape adhesive laminates, or flashings, which shall become apparent from the specification which follows, are accomplished by the invention as hereinafter described and claimed.

In general, the present invention provides an adhesive rubber article having at least one tacky surface for adhering to at least one substrate, the article comprising a guide presented on the at least one tacky surface for facilitating the alignment and application of the adhesive rubber article on the at least one substrate.

The present invention also provides an adhesive rubber article having at least one tacky surface for adhering to at least one substrate, the article comprising a guide presented on a surface opposite the at least one tacky surface for facilitating the alignment and application of the adhesive rubber article on the at least one substrate.

Other aspects and object of the present invention may be achieved by a release liner, in combination with an adhesive rubber article having at least one tacky surface for adhering to at least one substrate, the release liner being scored and carried by the adhesive rubber article and selectively removable therefrom.

The present invention also includes a method for applying an adhesive rubber article over a seam formed by at least two substrates, the adhesive rubber article having two surfaces, at least one of which is tacky and is capable of being adherred to said substrates and which is capable of engaging a scored release liner, comprising: removing at least a portion of the release liner from the adhesive rubber article; aligning a guide presented on one of the two surfaces with the seam formed by the substrates; and applying the adhesive rubber article to the substrates.

PREFERRED EMBODIMENT FOR CARRYING OUT THE INVENTION

As noted hereinabove, the problem of properly aligning adhesive rubber articles upon application thereof to cover or connect various substrates has long been recognized, particularly in the roofing industry. The present invention attempts to solve this problem by providing a means by which the applicator or installer can align the adhesive rubber article over the substrate or substrates being covered or connected.

More particularly, the present invention resides in the formation of an impression, mark or other guide on the adhesive rubber article to aid the applicator or installer in the alignment and positioning of the adhesive rubber article over the various substrates. By strategically locating the impression or guide on the adhesive rubber article at the place of manufacture, the manufacturer can facilitate the application and placement of the adhesive rubber article on or between substrates, thereby providing proper coverage of the substrate(s) so as to provide a watertight seal. In one preferred embodiment, the guide is a physical impression on the tacky surface of the rubber article. In another preferred embodiment the guide is a visual impression on the surface opposite the tacky surface.

The adhesive rubber articles of the present invention are generally well known in the art and include essentially any flexible adhesive rubber article suitable for covering or connecting substrates. These include the various adhesive rubber articles described in the background hereinabove, all of which are particularly useful in roofing applications. That is, preferred adhesive rubber articles includes splice tapes and rubber membranes which have been factory laminated to tape adhesives. It will be appreciated, however, that other adhesive rubber articles suitable for the particular purposes set forth herein may also be employed.

Figure 1:
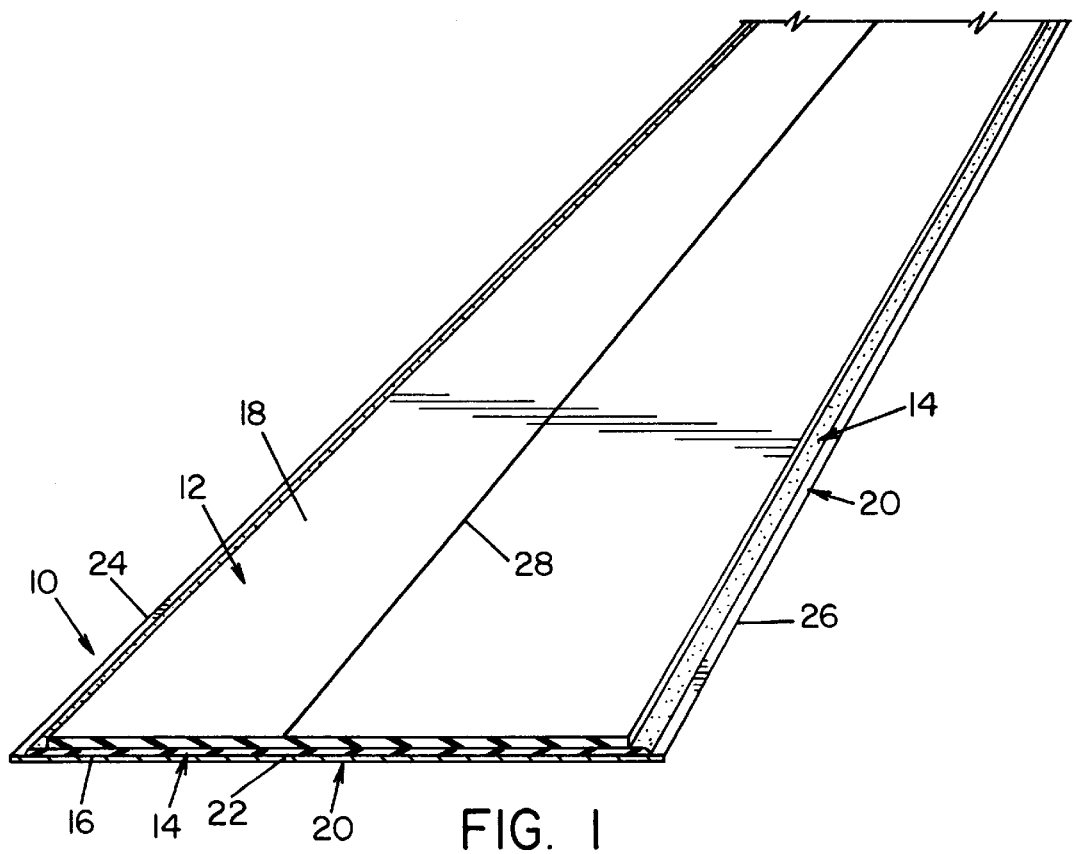
FIG. 1 is a perspective view of an adhesive rubber article prepared in accordance with the concepts of the present invention.

One representative form of an adhesive rubber article, in this case, a rubber membrane/tape adhesive laminate, is indicated generally by the numeral 10 in FIG. 1 of the accompanying drawings. This adhesive rubber article 10 includes a rubber membrane 12 which has been factory laminated to a tape adhesive 14 so as to include a generally tacky surface 16 provided by the tape adhesive 14 and a generally non-tacky surface 18 provided by the rubber membrane 12. It will be appreciated that splice tapes and other articles may have more than one tacky surface, but the general principle of those articles, i.e., to adhere to one or more substrates, is the same as the laminate depicted.

The rubber membrane 12 may be made from any of a number of polymeric based rubbers such as EPDM, IIR, or neoprene and may by laminated to the tape adhesive 14 in a cured state, an uncured state or a partially cured state. The tape adhesive 14 may also be produced from any of a number of polymeric based rubbers including EPDM and butyl-based rubbers. Suitable tape adhesives are commercially available from Ashland Chemical Company, of Ashland, Ohio, from Adco Products, Inc., of Michigan Center Mich., and from Firestone Building Products, Inc., of Carmel, Ind.

Once the rubber membrane 12 has been laminated to the tape adhesive 14, the adhesive rubber article 10 is preferably from about 0.02 to about 0.09 inches thick. Adhesive rubber articles like article 10 may be formed to any length but are commercially available in long strips of 100 feet or more, and are preferably about 5 to about 12 inches wide. It will be appreciated, however, that flashings or laminates can be produced in the form of smaller strips or patches of membrane, depending upon the desired application.

The tacky surface 16 of the adhesive rubber article 10 is generally covered and protected by a release liner 20. As stated hereinabove, release liners are well known in the art and are commonly made from a continuous sheet of paper having a special coating, typically a silicone coating, on at least one surface thereof which engages the tacky adhesive surface of the article. The special coating, which is also well known in the art, prevents the adhesive surface of the article from permanently adhering to the paper. Other forms of release liner, such as plastics may also be employed as discussed hereinabove.

Figure 2:
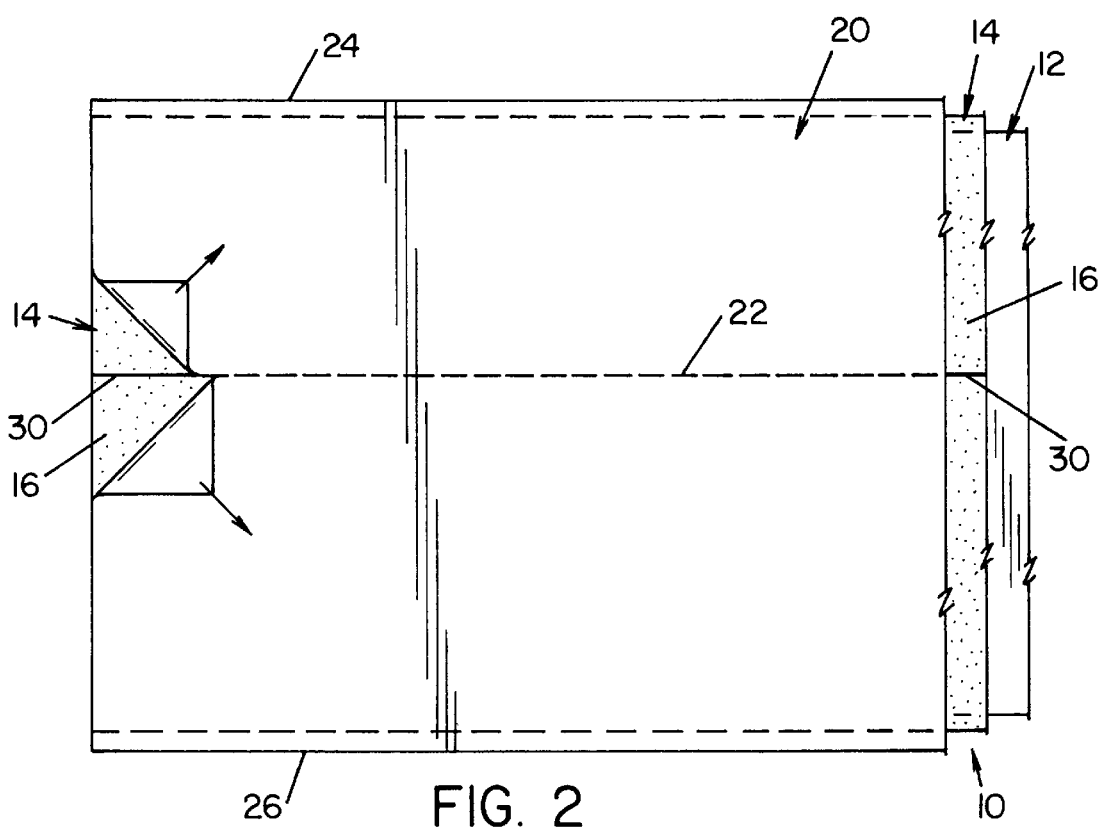
FIG. 2 is a bottom plan view of a scored release liner carrying the adhesive rubber article of FIG. 1.

As illustrated in FIG. 2, the release liner 20 is unique in that it is scored, perforated or otherwise split, as at 22, preferably in the longitudinal direction of the adhesive rubber article 10. More preferably, the score 22 is a generally straight and cut through the general center of the release liner 20 with respect to lateral edges 24 and 26.

It will be appreciated that the release liner may be scored or otherwise cut by any means known in the art such as with an apparatus having a toothed wheel suitable for cutting the release liner 20. In scoring the release liner 20, the liner is cut and may be divided into two separate portions extending the length of the adhesive rubber article 10. That is, the score 22 extends in the longitudinal direction of the adhesive rubber article for the entire length of the release liner.

Moreover, by folding or flexing the adhesive rubber article 10 away from the release liner 20 such that the lateral edges 24, 26 of the release liner 20 are brought closer together, the release liner will tend to disengage from the tacky surface 16 of the adhesive rubber article 10 at the score 22, thereby allowing the user to remove easily either portion of the release liner 20 from the adhesive rubber article 10 by peeling the release liner 20 away whenever desired. That is, in a preferred embodiment and as generally depicted in FIG. 2, the installer can remove one portion of the release liner by flexing the adhesive rubber article and peeling that portion of the release liner at a time from the score 22 outwardly to the edges thereof.

As can be seen in FIG. 2, the scoring of the release liner 20 results in the creation of a physical impression or mark, as at 30, on the tacky surface 16 of the tape adhesive. This physical impression or mark may be useful to the installer as a guide for aligning the adhesive rubber article 10 on a substrate. In instances where the strip of laminate has been manufactured into a roll of laminate having its tacky surface 16 (covered by a release liner) directed radially outward of the non-tacky surface 18, it will be appreciated that, when applying the rubber article to the substrate(s) after removing at least a portion of the release liner, the installer will readily be able to view the impression or guide 30 as the article is being unrolled over the substrate(s) to align and place the adhesive rubber article over the substrate(s) as desired.

Returning to FIG. 1, the adhesive rubber article 10 may alternatively or additionally includes an impression, as at 28 which is visible on the surface 18 opposite the tacky surface 16 for aligning the adhesive rubber article on at least one substrate. Preferably, the visual impression or mark 28 formed on the surface 18 of the adhesive rubber article 10, which is imperceptible when touched, but which aids the installer in the alignment of the adhesive rubber article over a seam created by two or more substrates, is also a guide.

With either impression 28 or 30, as shown in the drawings, the guide should preferably extend in a straight line in the longitudinal direction of the rubber article, and preferably central to the side edges of the article (even more preferably, the guide(s) should extend) the entire length of the article. Thus, in a most preferred embodiment, the visual impression 28 and the impression 30 is aligned with and corresponds to the score 22 on release liner 20. In fact, the guide(s) may be formed simultaneously with the scoring of the release liner 20. That is, the physical impression or mark 30 made on the tacky surface 16 of the adhesive rubber article is produced by the scoring of the release liner 20, while the visual impression or mark 28 on the non-tacky surface 18 may be made simultaneously in the same manner. Accordingly, both the score 22 and the guide(s) 28 and 30 preferably extend the length of the article and/or release liner in the longitudinal direction, and directly correspond to each another.

It will be appreciated that any method for forming the impression 28, including factory imprinting and other marking of the surface 18 are believed to fall within the scope of the present invention. It will also be appreciated that impression 28 is particularly useful where the strip of laminate has been manufactured into a roll of laminate having its non-tacky surface 18 directed radially outward of the tacky surface 16. The installer may then follow the impression 28 to insure that the laminate is being unrolled evenly over the substrate(s) to align and place the adhesive rubber article over the substrate(s) as desired.

In practice, the installer can now easily remove one or more portions of the release liner carried by the adhesive rubber article by folding the flexible article as discussed hereinabove and peeling or otherwise removing at least a portion of the release liner which is to be adhered to a particular substrate. It will be understood that, in practice, both portions of the release liner can be removed prior to application on the substrate(s) or one portion at a time may be removed, whereby the second portion can be peeled or removed once the adhesive rubber article has been properly aligned. In any event, it is advisable to not remove the release liner until just prior to application of the adhesive rubber article to the substrate.

It will be appreciated that the guide(s) 28 or 30 provides a unique means for aligning the adhesive rubber article during application of the article to the desired substrate(s) being covered or connected after removal of the release liner. It is particular useful in those areas, such as corner edges, having abutting perpendicular substrates since the guide, which is preferably centered with respect to the lateral edges of the article, can easily be located and positioned in the corner formed by the substrates.

Also, the guides 28 or 30 are seen as particularly useful in aiding an installer to use the article to cover seams and the like. In this situation, the guide can be visually monitored by the installer to follow the seam, thereby assuring both substrates forming the seam are properly covered.

Thus, it should be evident that the adhesive rubber articles of the present invention are highly effective in facilitating the application and placement of these articles by the applicator on or between various substrates, thereby further insuring proper coverage of the substrates so as to provide a watertight seal. The invention is particularly suited for splice tapes and rubber membrane/tape adhesive laminates, but is not necessarily limited thereto. Other adhesive rubber articles having at least one tacky surface and/or a release liner covering the tacky surface are also contemplated by the present invention. The adhesive rubber articles of the present invention can be used in a variety of applications, but are particularly suited for the roofing or similar industries where the bonding of rubber membranes is desired.

Based upon the foregoing disclosure, it should now be apparent that the use of the adhesive rubber articles described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, the adhesive rubber articles set forth hereinabove according to the present invention are not necessarily limited to those having only one tacky surface. Moreover, other means for scoring, splitting, perforating or cutting the release liner and for marking, indenting or otherwise forming the guide on the adhesive rubber article can be substituted for the toothed wheel as described. It will be appreciated that the step of scoring the release liner and the step of marking the tacky surface or the non-tacky surface can be performed either simultaneously in one step or as two steps and by other and separate means as known in the art. It will further be appreciated that while at least one guide is required, the guide on the opposite surface is optional. Thus, the scope of the invention shall include all modifications and variations that may fall within the scope of the attached claims.

What is claimed is:

1. An adhesive rubber article having at least one tacky surface for adhering to at least one substrate, the article comprising a first substantially end-to-end, guide formed on and made a part of the at least one tacky surface, and a second substantially end-to-end, guide formed on and made a part of a surface opposite the at least one tacky surface, said first and second guides facilitating the alignment and application of the adhesive rubber article on the at least one substrate, wherein said first and second guides are aligned with each other on the adhesive rubber article.

2. The adhesive rubber article as set forth in claim 1, wherein said guide is a physical impression made in the at least one tacky surface.

3. The adhesive rubber article as set forth in claim 1, wherein said adhesive rubber article is an adhesive strip, and said first and second guides extend in a straight line in a longitudinal direction for the entire length of said adhesive rubber article.

4. The adhesive rubber article as set forth in claim 1, further comprising a release liner engaging the at least one tacky surface of the adhesive rubber article and removable therefrom prior to adhering the adhesive rubber article to the at least one substrate.

5. The adhesive rubber article as set forth in claim 4, wherein said release liner is scored.

6. The adhesive rubber article as set forth in claim 5, wherein said release liner is scored in a longitudinal direction for an entire length of said adhesive rubber article.

7. The adhesive rubber article as set forth in claim 1, wherein said second guide is a visual mark on said surface opposite the at least one tacky surface.

8. In combination with an adhesive rubber article having a first substantially end-to-end, guide and at least one tacky surface for adhering to at least one substrate, a release liner carried on the at least one tacky surface of the adhesive rubber article and selectively removable therefrom, said release liner being scored to produce a score line is aligned with the first guide that is physically impressed into the tacky surface of the adhesive rubber article for facilitating the alignment and application of the adhesive rubber article to the at least one substrate.

9. The combination, as set forth in claim 8, wherein said adhesive rubber article is a long strip, and wherein said release liner is scored in a longitudinal direction for the entire length of said release liner.

10. The combination, as set forth in claim 9, wherein said adhesive rubber article includes a second guide formed on and made a part of a surface opposite the at least one tacky surface for facilitating the alignment and application of the adhesive rubber article on the at least one substrate.

11. The combination, as set forth in claim 10, wherein said second guide is a visual mark on the surface opposite the at least one tacky surface.

12. The combination, as set forth in claim 11, wherein said second guide is also aligned with the score line of said release liner.

13. The combination, as set forth in claim 12, wherein said first guide and said second guide are produced at the same time during the scoring of the release liner.

* * * * *